United States Patent
Ikram et al.

(10) Patent No.: US 11,616,529 B2
(45) Date of Patent: Mar. 28, 2023

(54) ADAPTIVE CABLE EQUALIZER

(71) Applicant: MACOM Technology Solutions Holdings, LLC, Lowell, MA (US)

(72) Inventors: Quazi Ikram, Lowell, MA (US); Naga Rajesh Doppalapudi, Lowell, MA (US); Saman Jafarlou, Lowell, MA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 133 days.

(21) Appl. No.: 17/175,515

(22) Filed: Feb. 12, 2021

(65) Prior Publication Data

US 2022/0263540 A1 Aug. 18, 2022

(51) Int. Cl.
*H04L 27/01* (2006.01)
*H04B 3/04* (2006.01)
*H04B 3/14* (2006.01)
*H04B 3/06* (2006.01)

(52) U.S. Cl.
CPC ............... *H04B 3/145* (2013.01); *H04B 3/06* (2013.01)

(58) Field of Classification Search
CPC ... H04B 3/02; H04B 3/04; H04B 3/06; H04B 3/14; H04B 3/145
See application file for complete search history.

(56) References Cited

U.S. PATENT DOCUMENTS

| | | | |
|---|---|---|---|
| 4,303,896 A | * | 12/1981 | Slabinski .......... H04L 25/03114 333/28 R |
| 4,534,064 A | | 8/1985 | Giacometti et al. |
| 4,545,078 A | | 10/1985 | Wiedeburg |
| 4,687,924 A | | 8/1987 | Galvin et al. |
| 4,734,914 A | | 3/1988 | Yoshikawa |

(Continued)

FOREIGN PATENT DOCUMENTS

| EP | 1471671 | 12/2004 |
|---|---|---|
| EP | 3500867 | 6/2019 |

(Continued)

OTHER PUBLICATIONS

French National Institute of Industrial Property ("INPI") Preliminary Report issued for Application No. FR191046 dated Jun. 19, 2020.

(Continued)

*Primary Examiner* — Blane J Jackson

(74) *Attorney, Agent, or Firm* — Weide & Miller, Ltd.

(57) ABSTRACT

A cable equalizer configured as part of a cable comprising a first stage, a second stage, and a third stage. The first stage comprises a first stage bias current circuit configured to generate a bias current and a pre-emphasis module configured to introduce pre-emphasis into a received signal to counter the effects of signal amplification. Also part of the first stage is a bias voltage circuit configured to provide a bias voltage to the first stage. The second stage comprises a buffer configured impedance match the first stage. The third stage comprises a third stage bias current circuit configured to generate a bias current and a tank equalizer circuit configured to perform frequency specific equalization on a second stage signal. An amplifier is configured to amplify the second stage signal to create an amplified signal, which is output from the cable equalizer by an output driver.

16 Claims, 5 Drawing Sheets

(56) References Cited

U.S. PATENT DOCUMENTS

| | | |
|---|---|---|
| 4,747,091 A | 5/1988 | Doi |
| 4,849,998 A | 7/1989 | Poklemba |
| 4,864,649 A | 9/1989 | Tajima et al. |
| 5,019,769 A | 5/1991 | Levinson |
| 5,039,194 A | 8/1991 | Block et al. |
| 5,047,835 A | 9/1991 | Chang |
| 5,057,932 A | 9/1991 | Lang |
| 5,194,828 A | 3/1993 | Kato et al. |
| 5,210,712 A | 5/1993 | Saito |
| 5,289,302 A | 2/1994 | Eda |
| 5,293,405 A | 3/1994 | Gersbach et al. |
| 5,334,826 A | 8/1994 | Sato et al. |
| 5,383,046 A | 1/1995 | Tomofuji et al. |
| 5,383,208 A | 1/1995 | Queniat et al. |
| 5,392,273 A | 2/1995 | Masaki et al. |
| 5,394,416 A | 2/1995 | Ries |
| 5,396,059 A | 3/1995 | Yeates |
| 5,448,629 A | 9/1995 | Bosch et al. |
| 5,471,501 A | 11/1995 | Parr et al. |
| 5,488,627 A | 1/1996 | Hardin et al. |
| 5,510,924 A | 4/1996 | Terui et al. |
| 5,557,437 A | 9/1996 | Sakai et al. |
| 5,574,435 A | 11/1996 | Mochizuki et al. |
| 5,594,748 A | 1/1997 | Jabr |
| 5,636,254 A | 6/1997 | Hase et al. |
| 5,699,022 A * | 12/1997 | Tovar ............ H04B 3/145 333/18 |
| 5,796,501 A | 8/1998 | Sotom et al. |
| 5,812,572 A | 9/1998 | King et al. |
| 5,822,099 A | 10/1998 | Takamatsu |
| 5,844,928 A | 12/1998 | Shastri et al. |
| 5,926,303 A | 7/1999 | Giebel et al. |
| 5,943,152 A | 8/1999 | Mizrahi et al. |
| 5,953,690 A | 9/1999 | Lemon et al. |
| 5,956,168 A | 9/1999 | Levinson et al. |
| 5,963,901 A | 10/1999 | Vahatalo et al. |
| 6,010,538 A | 1/2000 | Sun et al. |
| 6,014,241 A | 1/2000 | Winter et al. |
| 6,020,593 A | 2/2000 | Chow et al. |
| 6,021,947 A | 2/2000 | Swartz |
| 6,023,147 A | 2/2000 | Cargin, Jr. et al. |
| 6,049,413 A | 4/2000 | Taylor et al. |
| 6,064,501 A | 5/2000 | Roberts et al. |
| 6,108,113 A | 8/2000 | Fee |
| 6,111,687 A | 8/2000 | Tammela |
| 6,111,712 A | 8/2000 | Vishakhadatta et al. |
| 6,115,113 A | 9/2000 | Flockencier |
| H1881 H | 10/2000 | Davis et al. |
| 6,160,647 A | 12/2000 | Gilliland et al. |
| 6,175,434 B1 | 1/2001 | Feng |
| 6,259,293 B1 | 7/2001 | Hayase et al. |
| 6,282,017 B1 | 8/2001 | Kinoshita |
| 6,292,497 B1 | 9/2001 | Nakano |
| 6,317,062 B1 | 11/2001 | Payer et al. |
| 6,341,360 B1 | 1/2002 | Abdelilah et al. |
| 6,366,373 B1 | 4/2002 | MacKinnon et al. |
| 6,388,784 B1 | 5/2002 | Nakamura et al. |
| 6,438,450 B1 | 8/2002 | DiLorenzo |
| 6,445,662 B1 | 9/2002 | Tonami |
| 6,452,719 B2 | 9/2002 | Kinoshita |
| 6,494,370 B1 | 12/2002 | Sanchez |
| 6,556,601 B2 | 4/2003 | Nagata |
| 6,570,944 B2 | 5/2003 | Best et al. |
| 6,580,328 B2 | 6/2003 | Tan et al. |
| 6,661,940 B2 | 12/2003 | Kim |
| 6,707,492 B1 | 3/2004 | Itani |
| 6,707,600 B1 | 3/2004 | Dijaili et al. |
| 6,738,578 B1 | 5/2004 | Mihota |
| 6,740,864 B1 | 5/2004 | Dries |
| 6,801,555 B1 | 10/2004 | Dijaili et al. |
| 6,837,625 B2 | 1/2005 | Schott et al. |
| 6,852,966 B1 | 2/2005 | Douma et al. |
| 6,868,104 B2 | 3/2005 | Stewart et al. |
| 6,888,123 B2 | 5/2005 | Douma et al. |
| 6,909,731 B2 | 6/2005 | Lu |
| 6,934,307 B2 | 8/2005 | DeCusatis et al. |
| 6,934,479 B2 | 8/2005 | Sakamoto et al. |
| 6,941,077 B2 | 9/2005 | Aronson et al. |
| 6,952,531 B2 | 10/2005 | Aronson et al. |
| 6,956,643 B2 | 10/2005 | Farr et al. |
| 6,957,021 B2 | 10/2005 | Aronson et al. |
| 6,967,320 B2 | 11/2005 | Chieng et al. |
| 7,031,574 B2 | 4/2006 | Huang et al. |
| 7,039,082 B2 | 5/2006 | Stewart et al. |
| 7,046,721 B2 | 5/2006 | Grohn |
| 7,050,720 B2 | 5/2006 | Aronson et al. |
| 7,058,310 B2 | 6/2006 | Aronson et al. |
| 7,066,746 B1 | 6/2006 | Togami et al. |
| 7,079,775 B2 | 7/2006 | Aronson et al. |
| 7,184,671 B2 | 2/2007 | Wang |
| 7,215,891 B1 | 5/2007 | Chiang et al. |
| 7,227,916 B2 | 6/2007 | Ruelke et al. |
| 7,236,108 B2 | 6/2007 | Cheng |
| 7,265,334 B2 | 9/2007 | Draper et al. |
| 7,276,682 B2 | 10/2007 | Draper et al. |
| 7,381,935 B2 | 6/2008 | Sada et al. |
| 7,456,690 B2 | 11/2008 | Kocaman |
| 7,505,498 B2 | 3/2009 | Sanchez |
| 7,701,833 B2 | 4/2010 | Kim |
| 7,734,309 B2 | 6/2010 | Chi et al. |
| 7,949,025 B2 | 5/2011 | Olea |
| 7,978,012 B2 | 7/2011 | Wood |
| 8,213,494 B2 | 7/2012 | Hidaka |
| 8,396,110 B1 | 3/2013 | Hsieh |
| 8,861,578 B1 | 10/2014 | Lusted et al. |
| 8,948,614 B1 | 2/2015 | Schmidt |
| 8,995,514 B1 | 3/2015 | Asuncion et al. |
| 9,135,204 B1 | 9/2015 | Glogovsky, Jr. et al. |
| 9,231,803 B2 | 1/2016 | Nishi |
| 9,397,868 B1 | 7/2016 | Hossain et al. |
| 9,559,880 B1 | 1/2017 | Cirit et al. |
| 9,853,735 B1 | 12/2017 | Lin |
| 9,853,839 B2 | 12/2017 | Beukema et al. |
| 9,882,703 B1 | 1/2018 | Xu |
| 9,906,232 B1 | 2/2018 | Cho |
| 9,985,684 B2 * | 5/2018 | Chang ............ H04B 3/14 |
| 10,333,692 B2 | 6/2019 | Miura |
| 10,404,496 B1 | 9/2019 | Azenkot |
| 2002/0012152 A1 | 1/2002 | Agazzi |
| 2002/0097467 A1 | 7/2002 | Terahara et al. |
| 2002/0105982 A1 | 8/2002 | Chin et al. |
| 2002/0186048 A1 | 12/2002 | Tang et al. |
| 2003/0165168 A1 | 9/2003 | Murata |
| 2004/0001538 A1 | 1/2004 | Garrett |
| 2004/0047635 A1 | 3/2004 | Aronson et al. |
| 2004/0136727 A1 | 7/2004 | Androni et al. |
| 2004/0188717 A1 | 9/2004 | Ono |
| 2004/0208526 A1 | 10/2004 | Mibu |
| 2004/0251982 A1 * | 12/2004 | Gondi ............ H04B 3/143 333/28 R |
| 2005/0186918 A1 | 8/2005 | Ramet et al. |
| 2005/0215090 A1 | 9/2005 | Harwood |
| 2005/0226355 A1 | 10/2005 | Kibune et al. |
| 2006/0001494 A1 | 1/2006 | Garlepp et al. |
| 2006/0098699 A1 | 5/2006 | Sanchez |
| 2006/0126683 A1 | 6/2006 | Kang |
| 2006/0153256 A1 | 7/2006 | Sanchez |
| 2006/0165139 A1 | 7/2006 | Sanchez |
| 2007/0160173 A1 | 7/2007 | Takeuchi |
| 2007/0280388 A1 | 12/2007 | Torre |
| 2008/0111597 A1 | 8/2008 | Cranford et al. |
| 2008/0253439 A1 * | 10/2008 | Shakiba ............ H04L 25/03878 375/232 |
| 2008/0265998 A1 | 10/2008 | Wood |
| 2008/0290953 A1 | 11/2008 | Sandner et al. |
| 2008/0304559 A1 | 12/2008 | Wu |
| 2009/0141774 A1 | 6/2009 | Araki et al. |
| 2009/0244375 A1 | 10/2009 | Moehlmann et al. |
| 2010/0074615 A1 | 3/2010 | Kondo |
| 2011/0032013 A1 | 2/2011 | Nelson et al. |
| 2012/0002712 A1 | 1/2012 | Hayami |
| 2012/0038400 A1 | 2/2012 | Talaga, Jr. |
| 2013/0022309 A1 | 1/2013 | Yui |
| 2013/0287394 A1 | 10/2013 | Chaahoub |

(56) References Cited

U.S. PATENT DOCUMENTS

| | | |
|---|---|---|
| 2015/0180642 A1 | 6/2015 | Hsieh et al. |
| 2015/0381393 A1 | 12/2015 | Kotagiri |
| 2016/0006589 A1 | 1/2016 | Kamali |
| 2016/0352557 A1 | 12/2016 | Liao |
| 2016/0380785 A1 | 12/2016 | Chung |
| 2017/0033957 A1 | 2/2017 | Cao |
| 2017/0070370 A1 | 3/2017 | He et al. |
| 2017/0288369 A1 | 10/2017 | Ikram et al. |
| 2018/0062747 A1 | 3/2018 | Gupta |
| 2018/0159514 A1 | 6/2018 | Zerbe et al. |
| 2020/0195475 A1 | 6/2020 | Lin |

FOREIGN PATENT DOCUMENTS

| | | |
|---|---|---|
| JP | 58140175 | 8/1983 |
| JP | 62124576 | 6/1987 |
| JP | 62235975 | 10/1987 |
| JP | 62281485 | 12/1987 |
| KR | 1020050085785 | 8/2005 |
| KR | 1020100061753 | 6/2010 |
| KR | 1020170148184 | 12/2018 |
| KR | 1020180049784 | 5/2019 |
| WO | WO 93/21706 | 10/1993 |
| WO | WO 02/063800 | 8/2002 |
| WO | WO 2004/098100 | 11/2004 |
| WO | WO 2008/070138 | 6/2008 |
| WO | WO 2018/080652 | 5/2018 |

OTHER PUBLICATIONS

International Search Report issued for PCT/US2020/055839 dated Jan. 29, 2021.
International Search Report issued for PCT/US2020/050919 dated Dec. 21, 2021.
International Search Report issued for Application No. PCT/US2020/051657 dated Jan. 13, 2021.
Analog & Power, "An Introduction to clock distribution circuits", Alexander Pakosta, Texas Instruments, 2 pages, date unknown.
Texas Instruments, Application Report, "Using the CDCL6010 as a Frequency Synthesizer and Jitter Cleaner", Madhu Balasubramanian, SLLA259—Mar. 2007, Copyright © 2007, Texas Instruments Incorporated, 15 pages.
CDC7005, "3.3-V High Performance Clock Synihesizer and Jitter Cleaner", SCAS685J—Dec. 2002—Revised Jul. 2008, Copyright © 2008, Texas Instruments Incorporated, 33 pgs.
P.M Crespo Bofill, G. Shing Liu, C. Ho Wei, Combine Baud-rate timing recovery and adaptive equalization for high rate data transmission in digial subscriber lines. In Comunicaciones de Telefonica y Desarollo, vol. 41, No. 7, Jun. 1993. http://www.tid.es/presencia/publicationes/comsid/esp/articulos/vol41/combi/combi.html.

* cited by examiner

ADAPTIVE CABLE EQUALIZER

FIELD OF THE INVENTION

The invention relates to signal equalization and in particular to a method and apparatus for signal equalization within a cable.

RELATED ART

As is understood in the art, signal equalization is an effective tool to counter the effects on a signal related to passage through a channel. In some environments, it is necessary to connect electronic equipment located a short distance apart. Cables are often used to connect co-located equipment. However, in many instances, the signal passing through even a short cable results in an unacceptable level of signal degradation.

To address the signal degradation, equalization may be performed by equalizers which are integrated in the host module. However, this is a complex and expensive solution and may not be best suited as the nature or length of the cable changes or the host may be connected without use of cable interconnects.

Another proposed solution is active copper cable equalization which is built into the cable to extend the reach of the cables, such as twinax copper cables. The additional reach is useful to save the cost of datacenter interconnects. The equalizer may be integrated on the paddle card within the module of the cable. The drawback of prior art systems were numerous. One drawback of prior art cable-based equalizers is a lack of linearity. Non-linearity of the equalizer negates any equalization added at the host transmitter (pre-emphasis and de-emphasis). In addition, prior art equalizers introduced an unacceptable amount of noise which increased the BER (bit error rate).

SUMMARY

To overcome the drawbacks of the prior art, a cable equalizer is disclosed. In one embodiment, the cable equalizer comprises a first stage, a second stage, and a third stage. The first stage comprises a first stage bias current circuit configured to generate a bias current and a pre-emphasis module configured to introduce pre-emphasis into a received signal to counter the effects of signal amplification. Also part of the first stage is a bias voltage circuit configured to provide a bias voltage to the first stage. The second stage comprises a buffer configured impedance match the first stage. The third stage comprises a third stage bias current circuit configured to generate a bias current. Also part of the third stage is an equalizer circuit, configured to perform frequency specific equalization on a second stage signal, and an amplifier configured to amplify the second stage signal. An output driver configured to output an amplified equalized signal form the third stage. To overcome the drawbacks of the prior art, measures have been taken in the design to keep linearity high and noise low. In one embodiment, the cable equalizer is configured to provide 6 to 15 dB of boost at Nyquist frequency of 26.5625 GHz (100 G/lane) with high linearity and low noise.

In one embodiment, the cable equalizer further comprises a bias voltage circuit configured to provide a bias voltage to the first stage and the third stage. It is contemplated that the pre-emphasis module may comprise diode connected transistors in series with one or more resistors. The tank equalizer circuit may comprise two or more capacitors that may be switched into or out of the tank equalizer circuit responsive to a control signal. In one configuration, the amplifier comprises a cascode common emitter transistor pair and cross-coupled capacitors. It is also contemplated that the first stage bias current circuit and the third stage bias current circuit both generate current based on a control signal that controls bias current.

Also disclosed herein is a method for performing cable equalization comprising receiving a signal transmitted over a cable or to be transmitted over a cable and performing pre-emphasis processing on the signal to counter the effects of amplification to create a modified signal. Then, buffering the modified signal with an intermediate stage to optimize return loss and amplifying and equalizing the modified signal after buffering in response to effects on the signal from passing through the cable.

In one embodiment, pre-emphasis processing counters the frequency specific effects of amplification. This method may further comprise generating one or more bias currents which are used to perform pre-emphasis and amplifying, and further comprising adjusting the one more bias currents to optimize cable equalization. In addition, the method may further comprise generating one or more equalization control signals which are used to adjust a capacitance of an equalizer to optimize cable equalization. Customizing equalization may also occur using on one or more high frequency control signals and one or more low frequency control signals.

In another embodiment, a cable equalizer is disclosed which comprises a first stage that includes a pre-emphasis module configured to introduce pre-emphasis into a received signal to counter the effects of signal amplification. A third stage is provided which includes an equalizer circuit and amplifier circuit configured to perform frequency specific equalization and amplification. A buffer is located between the first stage and the second stage to minimize return loss between the first stage and the second stage.

In one embodiment, the pre-emphasis module comprises diode connected transistors in series with one or more resistors. The equalizer circuit comprises two or more capacitors that may be switched into or out of the tank equalizer circuit responsive to a control signal. The amplifier circuit may comprise a cascode common emitter transistor pair and cross-coupled capacitors. The cable equalizer may further comprise a first stage bias current circuit and a third stage bias current circuit both of which generate current based on a control signal that controls bias current. In one embodiment, the buffer comprises an emitter follower pair. The buffer may be configured to shunt high frequency signal components.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
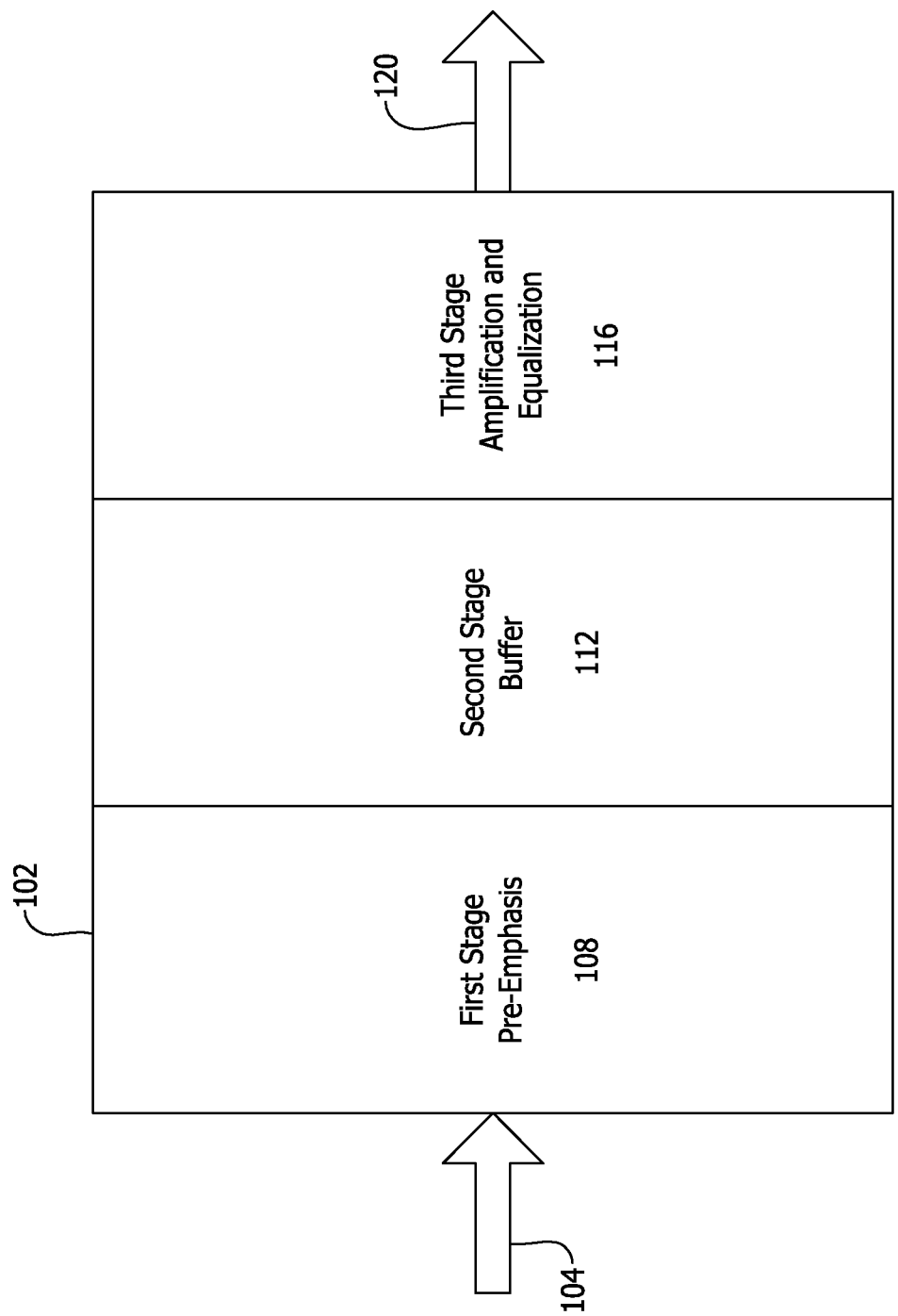
FIG. 1 illustrates a block diagram and an example embodiment of an adaptive cable equalizer.

FIG. 1 illustrates a block diagram and an example embodiment of an adaptive cable equalizer. In this example embodiment, an input, such as from the cable connects to the equalizer 102 to provide the signal to the equalizer. The cable may comprise one or more cables, such as copper conductors, and the signal may comprise one or more signals which pass through the cable. The input signal is provided to a first stage 108, which in this embodiment is configured to provide pre-emphasis to the received signal, to compensate for subsequent stages, as well as impedance match to the cable. The first stage 108 provides additional functionality as described below.

A second stage 112 connects to the first stage and is configured to perform buffering to interface the first stage 108 and a third stage 116. The third stage 116 is configured with amplification and equalization, as well as other functionality. The output of the third stage is provided on an output 120 that may be to the cable or a connector. The equalizer may be at one end of the cable, or at both ends.

Figure 2:
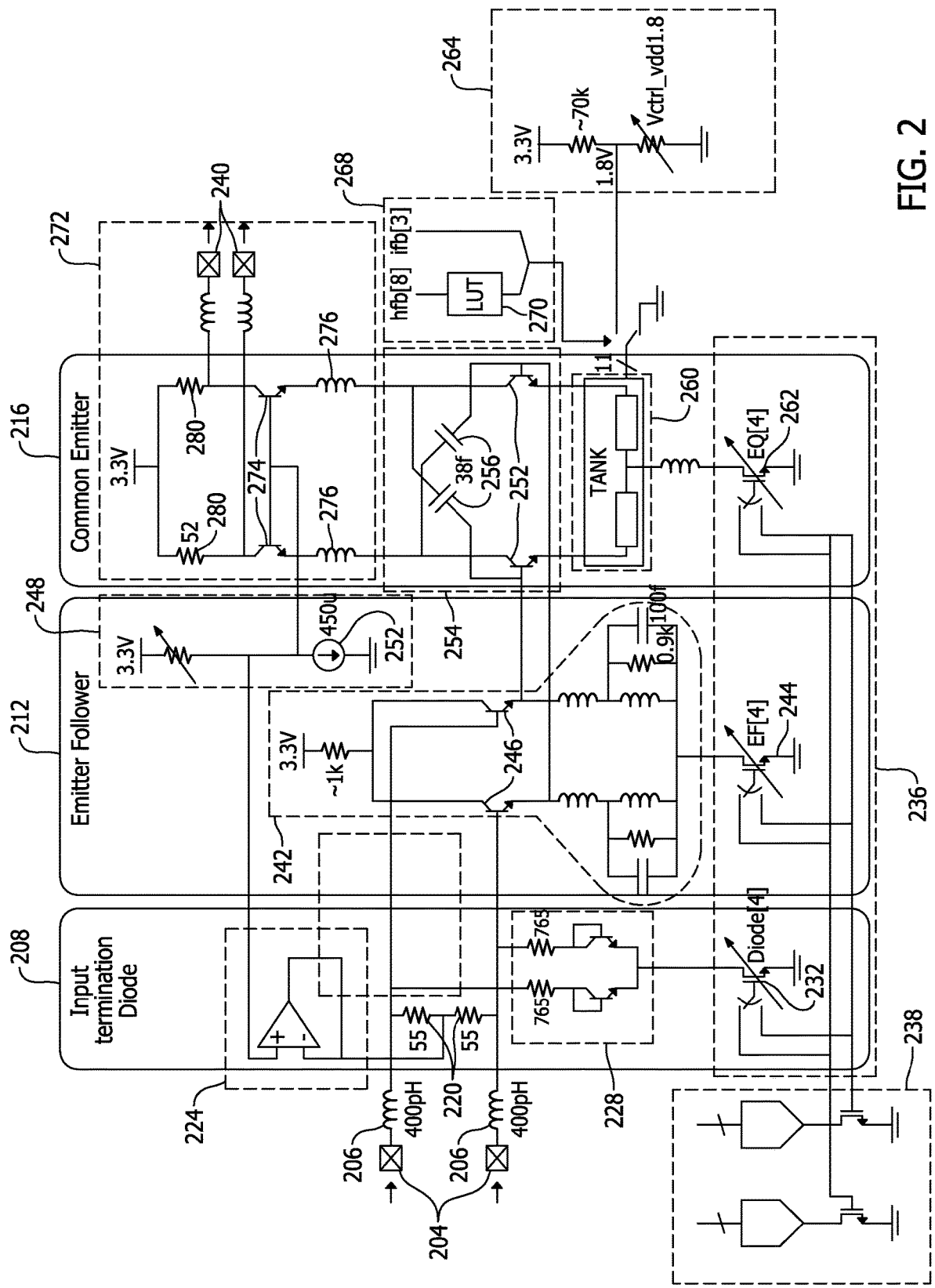
FIG. 2 illustrates an exemplary circuit diagram of a cable equalizer according to one embodiment.

FIG. 2 illustrates an exemplary circuit diagram of a cable equalizer according to one embodiment. This is but one possible circuit implementation and it is contemplated that other circuit layouts are possible without departing from the claims that follow. In addition, many of the circuit element groups are grouped within dashed boxes by functionality to aid in understanding and generalize aspects of the layout. As discussed herein, this configuration includes a first stage 208, a second stage 212, and a third stage 216.

As shown, inputs 204 are provided and configured to receive a signal from the cable. In series with each input path is an inductor 206 configured to decouple the circuit from the cable and to improve input return loss, as well as to resonate out the input capacitance of diode connected transistors 284 and the emitter follower stage and also improve input impedance matching. The inputs 204 connect to a first stage 208. Within the first stage 208 are 55 ohm impedance matching resistors 220 configured to impedance match at 50 ohms when combined with the resistors in the pre-emphasis module 228. In other embodiments, other resistor values may be used. The resistors 220 may also be referred to as termination resistors.

The input path also connects to a biasing circuit 224 configured to set and maintain a defined bias point (voltage) for a pre-emphasis module 228. In this embodiment, the biasing circuit 224 includes a two-input operational amplifier. The pre-emphasis module 228 includes resistors and transistors connected as diodes as shown to compensate for the non-linearity of the following stages, such as the third stage 216 by creating inverse pre-distortion. The diode connected transistors 284 operate as a voltage divider between the source impedance and input impedance as seen inside the integrated circuit. The diode connected transistors 284 have their base and collector shorted resulting in the remaining terminals, the base and emitter, configured as diode terminals. The pre-emphasis module 228 also connects to a variable biasing current transistor 232 configured to establish and provide the bias current for the first stage. The bias current may be adjusted to account for temperature, variation over process, or any other factor. In this embodiment, the first stage bias current source 232 has four different current settings, adjustable to all the bias current sources 232, 244, 262 for each stage, but in other embodiments, a greater or lesser number of bias current levels may be established.

The variable biasing current transistor 232 is part of a variable biasing current mirror bank 236 which provides tail bias currents to all three stages 208, 212, 216. A biasing bank control signal generator 238 provides control signals to the variable biasing current bank 236. The biasing bank control signal generator 238 includes two DACs (digital to analog converters) configured to convert a digital PTAT (proportional to Absolute Temperature) current from a bandgap reference generator 238, and a digital calibration current to analog signals which are used to adjust and control the transistors 232, 244, 262 configured as current mirrors and control the current output of the transistors in the variable biasing current bank 236. The inputs to the DACS may come from a memory or be stored or generated on chip. The variable biasing current bank 236 includes devices which provide a bias current for each stage 208, 212, 216 through the programable transistors 232, 244, 262 as shown. By controlling the switches that control the input to the variable transistors 232, 244, 262, two current types can be mixed to achieve different temperature coefficients which eventually can be managed to lower the temperature variation of gain boosts.

The pre-emphasis module 228 is configured to introduce pre-emphasis into the signal prior to amplification in the third stage 216 to counter the frequency dependent effects of amplification. Use of pre-emphasis within the equalizer increases and maintains linearity of the equalizer (located in the third stage 216) when viewed from inputs 204 to outputs 240.

Turning now to the second stage 212, the signal path feeds into a buffer 242 that, in this embodiment, includes numerous transistors, capacitors, inductors and a transistor pair 246 with a gain of one. The buffer 246 transistors are configured as an emitter follower pair 246 that helps maintain input return loss. The emitter follower pair 246 is configured to act as a buffer between the first stage 208 and the third stage 216 to optimize input return loss which would not be possible if the input stage tied to the output stage. The emitter follower pair 246 provides the advantage of being very linear, low noise and low power consumption. Because, in this exemplary configuration, the signal of interest is below 26 GHz, above this frequency the signal components are or included noise, and hence, not needed or wanted, and can be blocked. Thus, amplification occurs up to 26 GHz, and then signal attenuation occurs to block noise. The buffer 242 (e.g., the resistors, inductors, and capacitors) are configured such that at high frequencies, the capacitors become a short circuit, which shunts the high frequency signal components away from the next stage thereby maintain a low noise level.

A second stage bias current source 244 provides a bias current to the buffer. As configured with the first stage 208, the biasing bank control signal generator 238 generates control signals that are provided to the second stage bias current source 244. The second stage bias current source 244 has a switch associated therewith to control which of the two or more control signals are connected to the base of the transistor 224. In this embodiment, one control signal is based on or responsive to temperature and the other control signal is based on or responsive to testing and measurement that occurs during calibration.

In the upper section of the second stage 212 is a voltage generator 248 configured to provide voltage to the first stage bias voltage source 224. The voltage generator 248 includes a programable or variable resistor allowing the output voltage to be adjusted to account for manufacturing variables and variation over process. Once set at a desired level, it is generally maintained fixed during operation. In the voltage generator 248 is a current source 252 and a variable resistor 250, that can be used to adjust the voltage to a desired level.

Turning now to the third stage 216, the signal path connects to an amplifier 254 with a gain that, in this embodiment, is greater than one. The amplifier is formed by a cascode common emitter transistor pair 252 and cross-coupled capacitors 256 that are coupled to a switchable degenerative tank. The term degenerative designates that the tank attenuates all or a portion of the signal. The gain of the third stage 216 is directly can be expressed as:

$$A_v = G_m Z_{out} = \frac{g_m Z_{out}}{1 + g_m Z_{tank}} = Z_{out} Y_{tank}$$

where $Y_{tank}$ is the tank admittance.

The third stage 216 serves as the main programmable equalizer and final driver from the integrated circuit. Although not shown, an off chip, AC coupling capacitor may be required to block DC biasing from the host transmitter and receiver. The amplifier 254 is configured with a gain greater than one however, common mode gain is desired to be suppressed to avoid differential imbalance and unwanted resonance. To decrease the common mode gain, degenerative resistance and inductance are used in the emitter follower stage (second stage 212 and common emitter stage (third stage 216), respectively. To further reduce the common mode gain of the common emitter (third stage), the tank equalizer 260 may be placed inside a p-well and connected to a global GND though a large impedance.

The gate to collector connection, to the main differential pair, of the cross-coupled capacitors 256 cancels unwanted capacitance at the base of the third stage transistors 252 thereby increasing bandwidth of the third stage 216

Below the amplifier 254 is the tank equalizer 260 configured as a tank equalizer circuit. The tank equalizer 260 is described below in greater detail in connection with FIG. 5.

The tank equalizer 260 performs equalization on the signal and functions as a low pass filter, with a pass band cut off at frequencies over the relevant signal frequencies of interest, which in this embodiment is 26 GHz. Connecting to the tank equalizer 260 is an inductor and a third stage bias current source transistor 262 which is part of the bank 236 of bias current sources. The third stage bias current source transistor 262 is variable allowing it to switch between the two inputs shown, which are from the biasing bank control signal generator 238.

The tank equalizer 260 receives inputs from a voltage source 264 that provides the desired voltage to the tank equalizer 260, which for this embodiment is 1.8 volts created by a resistor network from a 3.3 volt source. In this embodiment, the tank transistors utilize a 1.8 volt supply. However, in other embodiments, the tank equalizer 260 may utilize different voltages.

Also providing input to the tank equalizer 260 is the equalization control signal source 268. The equalization control signal source 268 provides two control signals, which in this embodiment are low frequency bits control signal and high frequency bits control signals. The high frequency bits are from a look-up table (LUT) 270. The look-up table operation is used to correct for part to part variation and different cable lengths. In addition, different look-up tables may be stored in the memory to accommodate a greater range of environments and cable lengths/types. The use of the low frequency bits control signal and the high frequency bits control signal are discussed in greater detail below in connection with FIG. 5.

Above the amplifier 254 is an output driver (or output stage) 272 which includes the equalizer outputs 240. The output driver 272 receives the equalized amplified signal from the amplifier 254. The output driver 272 includes transistors 274 which have a base terminal connected to the bias voltage source 248 found in the second stage 212. Connecting the output driver 272 to the amplifier 254 are inductors 276 which function to block unwanted high frequency signal components and noise from the output ports 240. The output driver 272 includes a supply voltage connecting through output impedance matching resistors 280.

Figure 3:
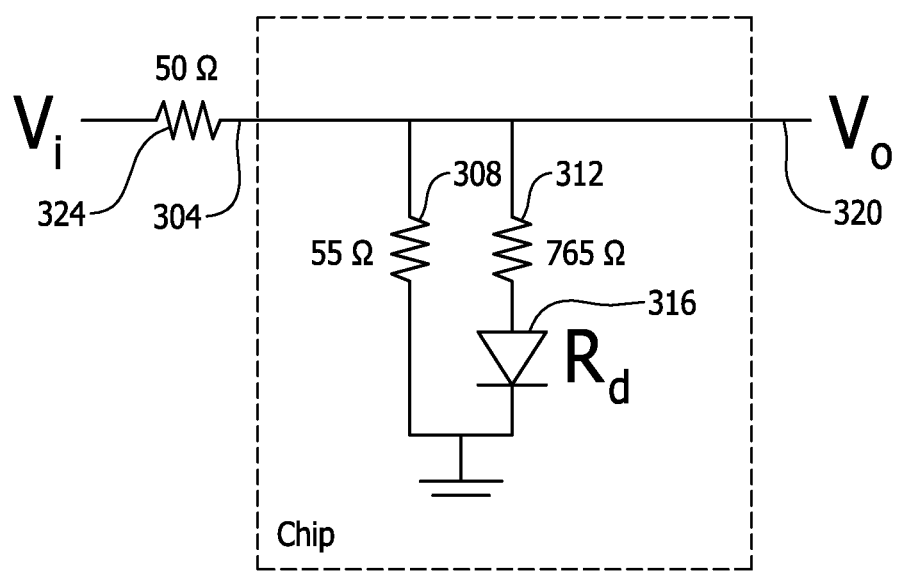
FIG. 3 illustrates a circuit diagram of an equivalent circuit for the diode connected transistors shown in FIG. 2.

FIG. 3 illustrates a circuit diagram of an equivalent circuit for the pre-emphasis module 228 shown in FIG. 2. The input termination diode pair 228 of FIG. 3 may be represented as a circuit having an input 304 connected to two resistors 308, 312 in parallel with one branch of the parallel connected resistors having a diode 316. The output Vo 320 is also shown. The diode 316 represents the diode connected transistors shown in FIG. 2. The equivalent resistors 308, 312 set an input impedance to match the transmission line input impedance, represented as 50 ohm resistor 324.

Figure 4:
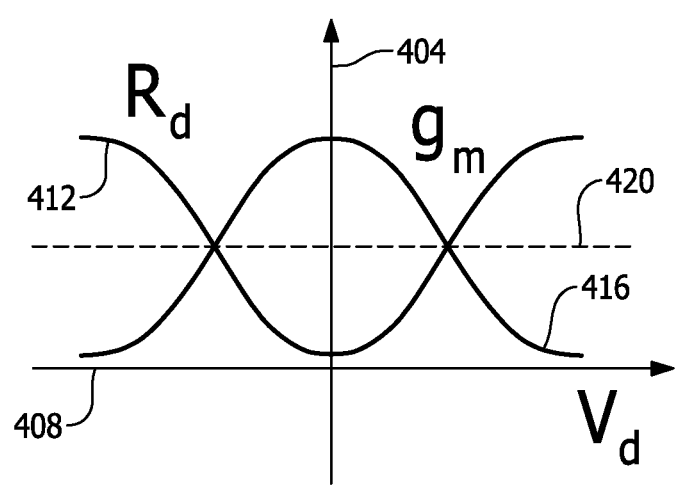
FIG. 4 illustrates an exemplary signal plot of the transfer function for two circuit components.

FIG. 4 illustrates exemplary signal plots of the transfer function for two circuit components. The vertical axis 404 represents transconductance ($g_m$) and the horizontal axis 408 represents Vd, which is the voltage across the diode connected transistors 284 of FIG. 2. A diode connected transistors transfer function plot 412 shows that the at high Vd voltages, pre-emphasis module 228 (FIG. 2) allows the signal to pass, while at low Vd voltage, the pre-emphasis module attenuates the signal.

Conversely, a third stage transfer function plot 416 is such that at high Vd voltages, the third stage 216 (FIG. 2) attenuates the signal, while at low Vd voltage, the third stage does not attenuate the signal. Rd plot 412 represents the transfer function of the first stage 208 resistance resulting from the diode connected transistors 284. The $g_m$ plot 416 represents the third stage transfer function. By multiplying or combining these two circuits transfer functions, the result is a more linear transfer function from input to output. In this manner, the combined transfer function may resemble plot 420, such that the first stage 208 provides pre-emphasis to compensate for the third stage 216, to maintain linearity across the equalizer from input to output.

Figure 5:
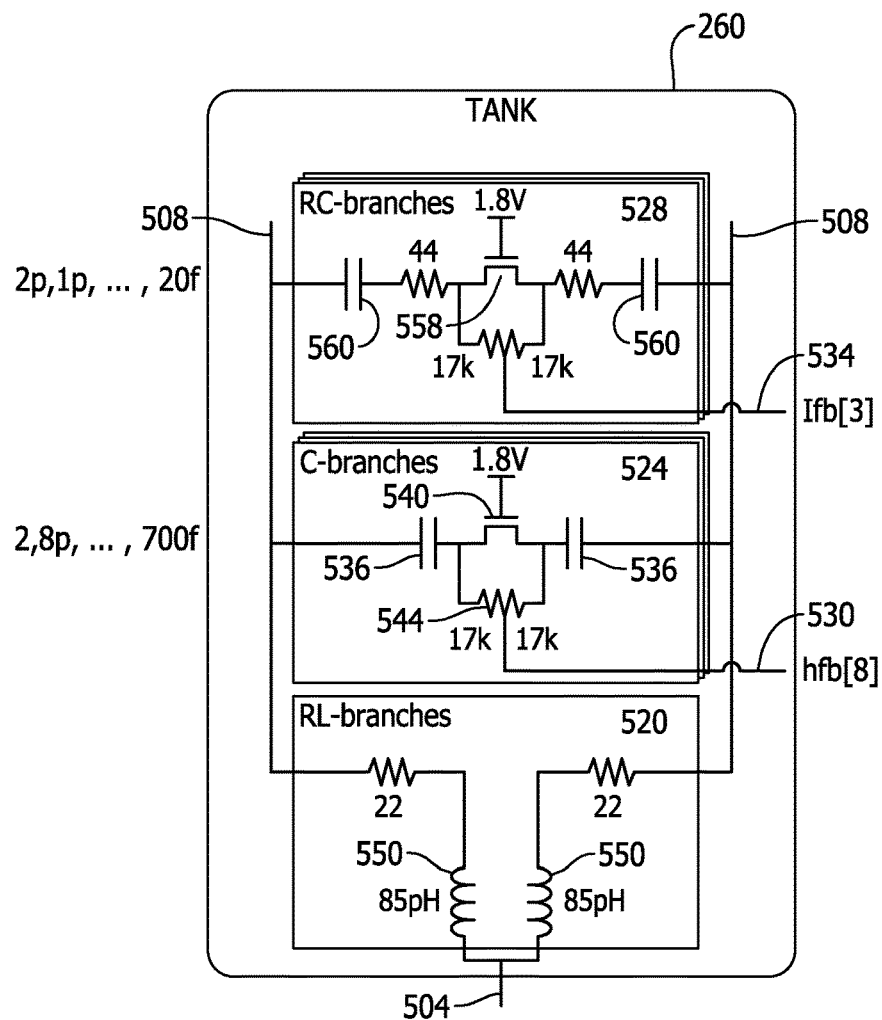
FIG. 5 illustrates an exemplary tank equalizer as may be implemented with the present innovation.

FIG. 5 illustrates an exemplary tank equalizer 260 as may be implemented with the present innovation. The circuit of FIG. 5 is an example representation of the tank equalizer 260 of FIG. 2. It is however contemplated that other equalizer circuits may be used which do not depart from the claims that follow. In this embodiment, the tank equalizer 260 includes a lower terminal 504 that connects to a bias current source and upper terminals 508 that connect to the amplifier 254 shown in FIG. 2. In series with the lower terminal 504 are inductors 550, which at high frequency make the resistors in a RL branch appear insignificant or as if not in the circuit due to the inductor appearing as an open circuit for very high frequencies. As a result, the inductors 550 maintain the input impedance of the tank equalizer 260 for high frequencies.

Inside the tank equalizer 260 are three equalization branches 520, 524, 528 which may comprise one or more sub-branches. One of the branches comprises a RL branch 520 configured with resistors as shown. The RL branch 520 includes resistor and inductors as shown. The RL branch 520 is configured to attenuate signal frequencies beyond the frequency range of interest. In this embodiment, the three equalization branches 520, 524, 528 are all connected in parallel.

The second equalization branch is referred to herein as a high frequency equalization branch 524 configured to equalize the high frequency components of the signal. The high frequency equalization branch 524 receives a control signal on high frequency control signal path 530. The control signal is provided to a resistor 544, which connects to split branches that include capacitors 536. Between the capacitors 536 is a switching transistor 540 configured to, responsive to the control signal, enable or disable the branch of the one or more high frequency equalization branches 524. Thus, the branch will be part of the circuit or excluded from the circuit (on or off) which in turn adjusts capacitance of the tank equalizer 260. In this embodiment, there are eight high frequency control signals on control signal path 530 and eight sub-branches in the high frequency equalization branch 524. In other embodiments, a greater or fewer number of sub-branches may be configured. In operation, the high frequency equalization branch 524 is controlled to selectively filter the high frequency components of the signal.

Also part of the equalizer is a low frequency equalization branch 528 that receives low frequency control signals on low frequency control signal path 534. The low frequency equalization branch 528 is configured similarly to the high frequency equalization branch 524 but also includes resistors in series with its capacitors. For DC or low frequency signal content, the capacitors appear as open circuits, while at high frequencies, the capacitors appear as short circuits, leaving the resistors as the dominant elements in the low frequency equalization branch. The low frequency control signals are provided on the low frequency control signal path 534, which in this embodiment comprises three control signals, each of which is provided to one of three sub-branches of the low frequency equalization branch 528. Operation of the low frequency equalization branch 528 is similar to the operation of the high frequency equalization branch 524.

The tank equalizer 260 is realized by an RL-branch parallel with multiple RC- and C-branches controlled by the switches, which may be NMOS devices. The RL-branch 520 sets DC gain by providing low frequency emitter degeneration. The eight RC-branches 528 control the gain in low frequency range (up to 10 GHz) whereas the three C-branches 524 are for high frequency range up to Nyquist frequency at 26.5 GHz. The parasitic elements existing in the actual implementation of RC- and C-branches 523, 528 cause the admittance to drop dramatically at higher frequency ranges. Therefore, at high frequencies the admittance of the tank equalizer 260 is determined by the RL branch 520, such that the inductor 550 helps to reduce the admittance of the branch. Low total admittance of the tank equalizer 260 leads to high degeneration and small gain boost. The steep roll-off beyond the Nyquist frequency is favorable to reduce the integrated noise of equalizer. The term integrated noise as used herein is defined to mean the noise associated with and introduced by each element of a circuit, which is integrated or accumulated over frequency. This noise improvement is achieved without consuming extra power which is conventionally used to reduce the noise.

The switch sizes (transistors 540, 558) are scaled proportional to the capacitor 636, 560 size for each branch 524, 528. Furthermore, to reduce the capacitance of body diodes, the control signal is connected to the drain terminal and source terminal of switches (transistors) 540, 558 whereas the gate is tied to 1.8 volt supply. The frequency response of the tank equalizer 260 is important for equalizer performance and, as a result, all the routing parasitic are minimized and modeled with accuracy. In addition, the MIM (metal, insulator, metal) capacitors are broken into the slices and tiled to establish the shortest routing Using the three branches, and the dynamically controllable control signals, the tank equalizer 260 may be tuned to selectively pass and block certain frequencies to tailor the frequency response to counter the effects of the channel. Equalizer tuning may also occur to optimize operation with the first stage pre-emphasis behavior to maintain as linear transfer function as needed in the frequency band of interest.

To calibrate the tank equalizer 260 frequency response over process variation, the RC time constant for each integrated circuit is measured during an automated testing at the time of manufacture. This measurement is based on the frequency of a test voltage-controlled oscillator with replica tank RCs as delay stages. After calibration, the tank selection control signals (bits) are adjusted to obtain constant frequency response independent of process corners. Moreover, the emitter follower (second stage 212) and equalizer bias currents are calibrated by a replica bias circuit to assure consistent gain over the process corner.

Figure 6:
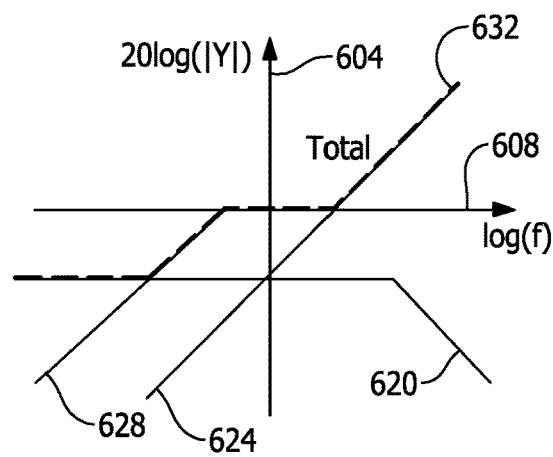
FIG. 6 illustrates an exemplary ideal or theoretical transfer function from equalizer input to output with each equalizer stage separately represented.

FIG. 6 illustrates an exemplary ideal or theoretical transfer function from equalizer input to output with each equalizer stage separately represented. This is but one possible equalizer transfer function plot and it is within the scope of the innovation to establish different equalizer transfer functions. The vertical axis 604 represents $20 \log(|Y|)$ which may be considered signal magnitude or attenuation level. The horizontal axis 608 represents logarithmic frequency in $\log(f)$.

A RL transfer function plot 620 represents the transfer function of the RL branch 520 (FIG. 5) of the tank equalizer 260. As shown in the RL transfer function plot 620, the transfer function of the RL branch 520 is flat, e.g., offers no attenuation at low frequencies, but then aggressively attenuates the signal beyond the frequency range of the signal of interest, which in one embodiment may be 25.6 GHz. This prevents high frequency signal noise from having an unwanted effect on the signal.

A high frequency branch transfer function plot 624 represents the transfer function of the high frequency branch 524 (FIG. 5) of the tank equalizer 260. As shown in the high frequency branch transfer function plot 624, the transfer function of the high frequency branch of the tank equalizer 260 offers less attenuation at higher frequencies than at lower frequencies. For low frequencies, the high frequency branch of the tank equalizer 260 may appear as an open circuit due to the behavior of the capacitors, at high frequencies, the capacitors 536 (FIG. 5) will appear as a short circuit.

A low frequency branch transfer function plot 628 represents the transfer function of the low frequency branch 528 (FIG. 5) of the tank equalizer 260. As shown in the low frequency branch transfer function plot 628, the transfer function of the low frequency branch of the tank equalizer 260 offers less attenuation at higher frequencies than at lower frequencies. For low frequencies, it may appear as an open circuit due to the behavior of the capacitors. While for mid frequencies the resistors within the low frequency branch 528 transition the transfer function to generally flat, and then at high frequencies, the capacitors in the low frequency branch 528 (FIG. 5) will appear as a short circuit, thereby establishing less attenuation at high frequencies.

An overall transfer function plot 632 shows the combined transfer function of the three plots which is the overall transfer function of the tank equalizer 260. As can be seen, it is a generally a high pass filter with a flat frequency response at the mid frequencies.

Figure 7:
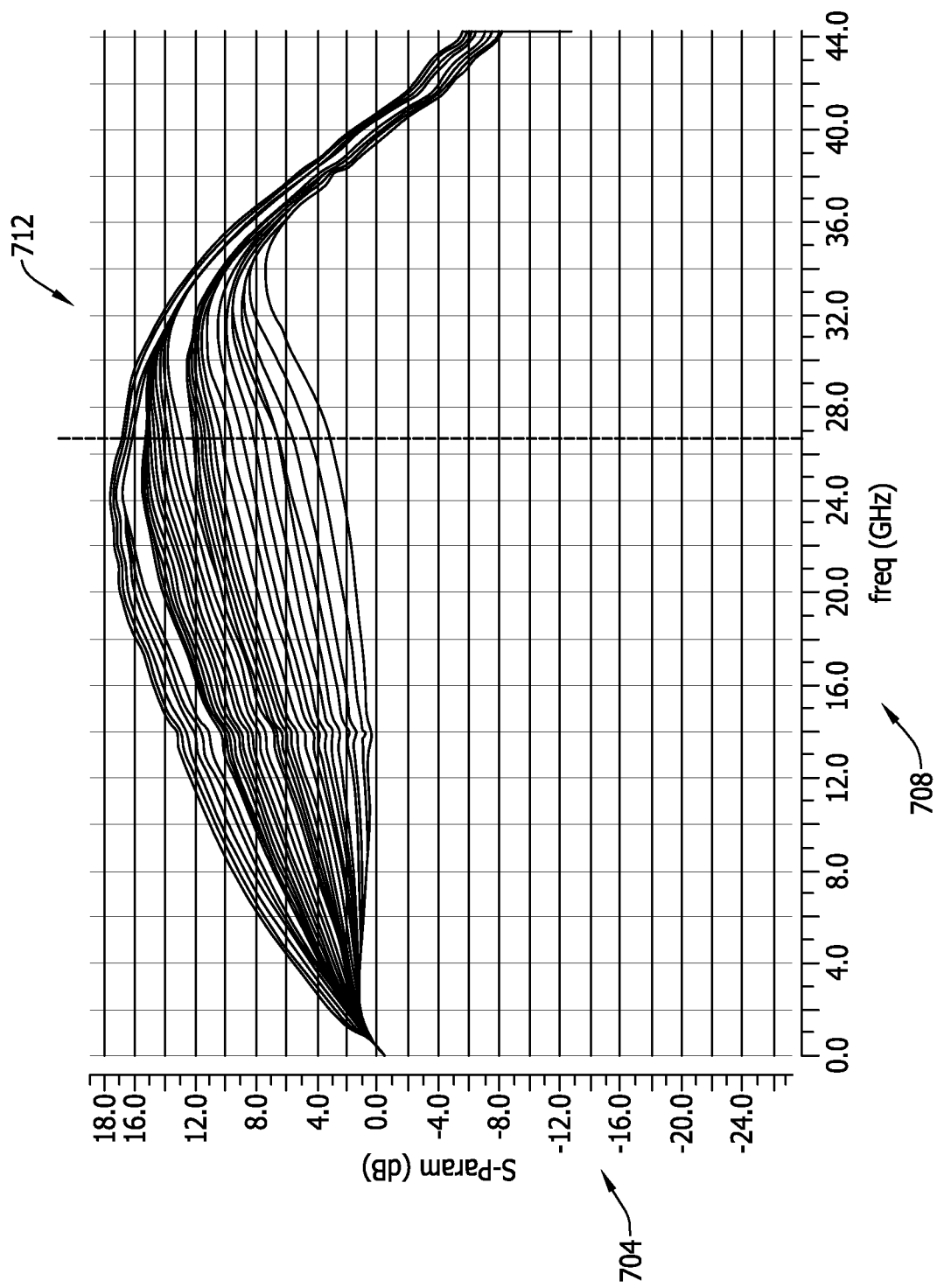
FIG. 7 illustrates exemplary plots of the equalizer output for various equalizer control inputs.

FIG. 7 illustrates exemplary plots of the equalizer output for various equalizer control inputs. These are is but one possible set of transfer function plots showing various equalizer performance results. As shown, the vertical axis 704 represents output signal power in relation to frequency, shown in the horizontal axis 708. The various plots 712 were developed during testing of the design implemented with this technology and show various frequency behavior of the equalizer resulting from switching in and out different sub-branches of the equalizer resulting in different tank equalizer 260 settings. As discussed above, the eight switches of the high frequency branch 524 (FIG. 5) were turned on and off to sweep the gain boost as shown in FIG. 5 to create these plots. It is evident that these switch (transistor) operations mainly impact the high frequency band boost changing the 26 GHz gain from 6.1 dB to 16 dB with step size less than 0.2 dB. In other embodiments, other frequency and gain levels may be established.

Numerous benefits are realized by the innovation described herein. One improvement is an increase in linearity realized by using pre-emphasis in the first stage to counter the non-linearity of the amplifier in the third stage. Although the third stage amplifier is made as linear as possible, all amplifiers inherently have some non-linearity, particularly as the amplifier input signal becomes larger, and as such, the first stage counters this drawback and improves overall linearity from cable input to cable output. Maintaining linearity of the cable is important to overall system environment operation While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A cable equalizer configured as part of a cable comprising:
    a pre-emphasis stage comprising:
        a pre-emphasis module configured to introduce pre-distortion into a received signal to counter the effects of subsequent processing;
    an output stage comprising:
        an equalizer circuit configured to perform frequency specific amplification on an output stage signal;
        an output driver configured to perform impedance matching to the cable and output an equalized signal from the output stage to the cable;
    a buffer configured impedance match the pre-emphasis stage and the output stage; and
    one or more bias voltage circuits configured to provide one or more bias voltages to the pre-emphasis stage and the output stage.

2. The cable equalizer of claim 1 wherein the pre-emphasis module comprises diode connected transistors in series with one or more resistors.

3. The cable equalizer of claim 1 wherein the equalizer circuit comprises two or more capacitors that may be switched into or out of a tank equalizer circuit responsive to a control signal.

4. The cable equalizer of claim 1 wherein the equalizer circuit comprises a cascode common emitter transistor pair and cross-coupled capacitors.

5. The cable equalizer of claim 1 further comprising a pre-emphasis stage bias current circuit and an output stage bias current circuit both generate bias current based on a control signal that controls bias current.

6. A method for performing cable equalization comprising:
    receiving a signal transmitted over a cable or to be transmitted over a cable;
    performing pre-distortion processing with a pre-emphasis module on the signal to counter the effects of amplification to create a modified signal, wherein the pre-distortion processing counters the frequency specific effects of amplification;
    buffering the modified signal with an intermediate stage to optimize return loss; and
    equalizing the modified signal after buffering to counter effects on the signal from passing through the cable.

7. The method of claim 6 further comprising generating one or more bias currents with bias circuits provide bias current to enable pre-distortion processing and further comprising adjusting at least one of the one more bias currents to optimize cable equalization.

8. The method of claim 6 further comprising generating one or more amplification control signals which are used to adjust a capacitance to optimize cable equalization.

9. The method of claim 6 further comprising customizing amplification based on one or more high frequency control signals and one or more low frequency control signals.

10. A cable equalizer comprising:
    a pre-emphasis stage comprising a pre-emphasis module configured to introduce pre-distortion into a received signal to counter the effects of an output stage;
    the output stage comprising an equalizer circuit configured to perform frequency specific amplification;
    a buffer between the pre-emphasis stage and the output stage to minimize return loss between the pre-distortion stage and the output stage; and
    one or more bias current circuits configured to generate one or more bias currents based on one or more control signals that control the one or more bias currents.

11. The cable equalizer of claim 10 wherein the pre-emphasis module comprises diode connected transistors in series with one or more transistors.

12. The cable equalizer of claim 10 wherein the equalizer circuit comprises two or more capacitors that may be switched into or out of a tank equalizer circuit responsive to a control signal.

13. The cable equalizer of claim 10 wherein the equalizer circuit comprises a cascode common emitter transistor pair and cross-coupled capacitors.

14. The cable equalizer of claim 10 wherein the buffer comprises an emitter follower pair.

15. The cable equalizer of claim 10 wherein the buffer is configured to shunt high frequency signal components.

16. The cable equalizer of claim 10 wherein the output stage is further configured to perform output impedance matching.

* * * * *